United States Patent [19]

Morris et al.

[11] Patent Number: 4,551,520

[45] Date of Patent: Nov. 5, 1985

[54] POLYESTERS OF TRANS-4,4-STILBENEDICARBOXYLIC ACID, TEREPHTHALIC ACID AND 1,4-CYCLOHEXANEDIMETHANOL

[75] Inventors: John C. Morris; Winston J. Jackson, Jr., both of Kingsport, Tenn.

[73] Assignee: Eastman Kodak Company, Rochester, N.Y.

[21] Appl. No.: 676,909

[22] Filed: Nov. 30, 1984

[51] Int. Cl.[4] .............................................. C08G 63/16
[52] U.S. Cl. .................................. 528/302; 528/305; 528/307; 528/308; 528/308.1
[58] Field of Search ............... 528/302, 305, 307, 308, 528/308.1

[56] References Cited

U.S. PATENT DOCUMENTS

| | | | |
|---|---|---|---|
| 4,398,022 | 8/1983 | Sublett | 528/302 |
| 4,420,607 | 12/1983 | Morris et al. | 528/302 X |
| 4,459,402 | 7/1984 | Morris et al. | 528/302 X |
| 4,468,510 | 8/1984 | Morris et al. | 528/302 X |

*Primary Examiner*—Lucille M. Phynes
*Attorney, Agent, or Firm*—John F. Stevens; William P. Heath, Jr.

[57] ABSTRACT

The polyesters of 95 to 40 mol % terephthalic acid, 5 to 60 mol % trans-4,4'-stilbenedicarboxylic acid, and at least 60 mol % 1,4-cyclohexanedimethanol can be injection molded to give shaped objects having exceptionally high impact strength and good chemical resistance. In addition, the polyesters of this invention can be extruded into films, spun into fibers, or blown into bottles having these properties.

6 Claims, No Drawings

POLYESTERS OF TRANS-4,4-STILBENEDICARBOXYLIC ACID, TEREPHTHALIC ACID AND 1,4-CYCLOHEXANEDIMETHANOL

DESCRIPTION

Technical Field

This invention relates to polyesters of high molecular weight useful as films, fibers and molding plastics. It is particularly concerned with copolyesters comprising repeating units from 5-60 mol % trans-4,4'-stilbenedicarboxylic acid, 95-40 mol % of terephthalic acid, and at least 60 mol % 1,4-cyclohexanedimethanol, the polyesters having an inherent viscosity of about 0.3 or more and, when injection-molded, a notched Izod impact strength of greater than 2.0 ft-lb/in. at $-40°$ C.

This invention provides molding plastics of superior impact strength and toughness, especially at low temperatures, compared to those of conventional polyesters prepared from aromatic acids and aliphatic glycols. Fibers and films with high toughness may be made from the polyesters of this invention.

BACKGROUND OF THE INVENTION

U.S. Pat. No. 2,657,195 broadly discloses polyesters of various stilbenedicarboxylic acid isomers with various glycols, aminoalcohols, and diamines. Various glycols are disclosed containing 2 to 16 carbon atoms, but 1,4-cyclohexanedimethanol is not specifically disclosed and no examples containing this glycol are given.

U.S. Pat. No. 3,496,839 relates to low molecular weight homopolyesters of 4,4'-stilbenedicarboxylic acid and aliphatic glycols useful in radiation-cured crosslinked polyester coatings. The 1,4-cyclohexanedimethanol monomer is disclosed in column 2, lines 28 and 29, in a general listing of glycols useful in these coatings. No examples are given. Neither U.S. Pat. No. 2,657,195 nor U.S. Pat. No. 3,496,839 distinguishes one stilbenedicarboxylic acid isomer from another, i.e., 4,4' from 3,3' or cis from trans, etc.

U.S. Pat. No. 4,420,607, U.S. Pat. No. 4,459,402, and U.S. Pat. No. 4,468,510 all disclose polyesters containing units from trans-4,4'-stilbenedicarboxylic acid and 1,4-cyclohexanedimethanol. U.S. Pat. No. 4,420,607 and U.S. Pat. No. 4,468,510 specifically disclose polyesters of terephthalic acid and 1,4-cyclohexanedimethanol modified with 50 to 100 mol % trans-4,4'-stilbenedicarboxylic acid (see Table 1 in each patent).

Other patents which disclose trans-4,4'-stilbenedicarboxylic acid are Japanese Kokai No. 72348/74, U.S. Pat. Nos. 2,657,194, 3,190,174, 3,247,043, 3,842,040, 3,842,041, and 4,073,777. No 1,4-cyclohexanedimethanol examples are given. Polyesters of trans-4,4'-stilbenedicarboxylic acid and neopentyl glycol, 1,5-pentanediol, 1,6-hexanediol, and 1,10-decanediol are disclosed by Meuresse, et al., in the *British Polymer Journal*, Volume 13, 1981, page 57 (Table 1).

DISCLOSURE OF THE INVENTION

We have discovered a range of polymer compositions based on 1,4-cyclohexanedimethanol, terephthalic acid and trans-4,4'-stilbenedicarboxylic acid (SDA) having exceptionally high impact strength, especially at low temperatures, and with improved heat resistance. The homopolymer poly(70/30 trans/cis 1,4-cyclohexylenedimethylene terephthalate) has high impact strength (17 ft-lb/in.) at 23° C. which falls off to less than about 3 ft-lb/in. at $-40°$ C. As is the case with most polyesters, modification of this polymer with a rigid dicarboxylic acid would be expected to lower notched Izod impact strength. We have found unexpectedly that modification of this homopolymer with 5-60 mol % trans-4,4'-stilbenedicarboxylic acid gives copolyesters which retain high notched Izod impact strength at 23° C. and have 2 to 15 times the $-40°$ C. notched Izod impact strength of the unmodified homopolymer (Table 1). Even the copolyester consisting of 40 mol % terephthalic acid units, 60 mol % trans-4,4'-stilbenedicarboxylic acid and 100 mol % 70/30 trans/cis 1,4-cyclohexanedimethanol retains at $-40°$ C. its notched Izod impact strength determined at 23° C. (2.3 ft-lb/in.) The polyesters of this invention are prepared from terephthalic acid and/or its esters, trans-4,4'-stilbenedicarboxylic acid and/or its esters, and 1,4-cyclohexanedimethanol. Examples of useful esters are the dimethyl, diethyl, dipropyl, dibutyl, diphenyl, or any combination of these mixed esters.

The terephthalic acid portion of the polymer may vary from about 95 mol % to about 40 mol %, preferably about 90 to about 50 mol %, and the trans-4,4'-stilbenedicarboxylic acid portion of the polymer may vary from about 5 to about 60 mol %, preferably about 10 to about 50 mol %, such that the sum of the dicarboxylic acid portions of the polymer is equal to 100 mol %. The dicarboxylic acid portion of the polymer may contain up to 30 mol % of other aromatic dicarboxylic acids having 8 to 20 carbon atoms such as isophthalic acid, 2-chloro- or 2,5-dichloroterephthalic acid, 2-methylterephthalic acid, 4,4'-biphenyldicarboxylic acid, and 2,6-napthalenedicarboxylic acid. Terephthalic acid is preferred.

The 1,4-cyclohexanedimethanol portion of the polymer may consist of either trans-1,4-cyclohexanedimethanol or cis-1,4-cyclohexanedimethanol or any mixture of these isomers. A mixture of isomers consisting of at least 70% trans-1,4-cyclohexanedimethanol is preferred.

The 1,4-cyclohexanedimethanol portion of the polymer may also contain up to 40 mol %, preferably less than 20 mol %, of another aliphatic glycol containing 2 to 10 carbon atoms such that the sum of the glycol portions of the polymer is equal to 100 mol %. Examples of useful glycols are ethylene glycol, 1,2-propanediol, 1,3-propanediol, 2,2-dimethyl-1,3-propanediol, trans- or cis-2,2,4,4-tetramethyl-1,3-cyclobutanediol, 1,4-butanediol, 1,5-pentanediol, 1,6-hexanediol, 1,3-cyclohexanedimethanol, or p-xylenediol.

The inherent viscosity of the terephthalic acid/trans-4,4'-stilbenedicarboxylic acid/1,4-cyclohexanedimethanol polymers of this invention is at least 0.3 and preferably 0.6 or more. The polymers are prepared in the melt or by solid-phase polymerization or by a combination of these processes using conventional techniques.

In addition, poly(ether-imides) such as Ultem poly(ether-imide) from General Electric, polyphenylene oxides such as poly(2,6-dimethylphenylene oxide), polyphenylene oxide/polystyrene blends such as Noryl from General Electric, and polycarbonates, polyesters, poly(ester carbonates), polysulfones, polysulfone ethers, and polyether ketones of aromatic dihydroxy compounds, including the dihydroxy compounds disclosed in U.S. Pat. Nos. 3,030,335 and 3,317,466, may be used as blend modifiers to raise heat resistance. The unmodified bisphenol A polycarbonate is preferred.

All inherent viscosities are determined at 25° C. in 60/40 (wt/wt) phenol/tetrachloroethane (PTCE) at a concentration of 0.5 g/100 mL.

The polymer glass transition temperatures ($T_g$) are determined using a Perkin-Elmer DSC-2 Differential Scanning Calorimeter at a scan rate of 20° C./minute.

The polyesters are ground to pass a 3-mm screen, dried at 80°–110° C. for 24 hours in a vacuum oven, and molded on a one-ounce Watson-Stillman injection-molding machine to give 5×½×⅛-inch flexure bars. The notched Izod impact strength is determined by taking an average of five breaks following the procedure of ASTM D256.

The following examples are submitted for a better understanding of the invention.

EXAMPLE 1

The following example illustrates the preparation of a polymer consisting of 60 mol % terephthalic acid repeating units, 40 mol % trans-4,4'-stilbenedicarboxylic acid repeating units, and 100 mol % 70% trans/30% cis 1,4-cyclohexanedimethanol repeating units.

A mixture of 87.5 g (0.45 mol) dimethyl terephthalate, 88.8 g (0.30 mol) dimethyl trans-4,4'-stilbenedicarboxylate, 185.1 g (0.90 mol) 70% trans/30% cis 1,4-cyclohexanedimethanol (70% solution in MeOH), and 0.14 g titanium tetraisopropoxide is placed in a 1-litre flask equipped with an inlet for nitrogen, a metal stirrer, and a short distillation column. The flask is gradually heated to 190° C. to allow the excess methanol to distill. The flask is then heated about 20 minutes at 190° C., 20 minutes at 220° C., and 20 minutes at 280° C. The reaction temperature is raised to 300° C. and a vacuum of 0.5 mm is gradually applied. Full vacuum is maintained for about 50–60 minutes. A light yellow, high melt viscosity polymer is obtained with an I.V. of 0.83 and a $T_g$ of 120° C. The polymer is ground and molded to give flexure bars with a notched Izod impact strength of 16 ft-lb/in. at 23° C. and 14 ft-lb/in. at −40° C.

EXAMPLE 2

A polymer consisting of 90 mol % terephthalic acid units, 10 mol % trans-4,4'-stilbenedicarboxylic acid units, and 100 mol % 1,4-cyclohexanedimethanol (70% trans/30% cis) units is prepared according to the procedure of Example 1 to an I.V. of 0.95. The polymer is ground, dried and solid-phase polymerized one hour at 240° C. to give a polymer with an I.V. of 1.04. The polymer has a $T_g$ of 103° C. The polymer is molded to give flexure bars with a notched Izod impact strength of 24 ft-lb/in. at 23° C. and 15 ft-lb/in. at −40° C.

EXAMPLE 3

A polymer consisting of 70 mol % terephthalic acid units, 30 mol % trans-4,4'-stilbenedicarboxylic acid units, and 100 mol % 1,4-cyclohexanedimethanol (70% trans/30% cis) units is prepared according to the procedure of Example 1 to an I.V. of 0.91. The polymer has a $T_g$ of 115° C. The polymer is molded to give flexure bars with a notched Izod impact strength of 18 ft-lb/in. at 23° C. and 14 ft-lb/in. at −40° C. Also, molded bars are unaffected after exposure for 24 hours to such solvents as methyl isobutyl ketone, ethyl acetate, acetone, gasoline, and ethanol, indicating unusually good solvent resistance.

EXAMPLE 4

A polymer having the same dicarboxylic acid content as Example 3 is prepared using 100% trans-1,4-cyclohexanedimethanol, following the procedure of Example 1, to an I.V of 0.81. The polymer has a $T_g$ of 126° C.

EXAMPLE 5 (Control)

A polymer consisting of 100 mol % terephthalic acid units and 100 mol % 1,4-cyclohexanedimethanol (70 trans/30% cis) units is prepared according to the procedure of Example 1 to an I.V. of 0.76. The polymer has a $T_g$ of 88° C. The polymer is ground, dried and molded to give flexure bars with a notched Izod impact strength of 17 ft-lb/in. at 23° C. and 1.3 ft-lb/in. at −40° C.

EXAMPLE 6 (Control)

A polymer having the same composition as Example 5 is prepared and solid-phased polymerized to an I.V. of 1.00 according to the procedure of Example 2. The polymer is ground, dried and molded to give flexure bars with a notched Izod impact strength of 15 ft-lb/in. at 23° C. and 3.0 ft-lb/in. at −40° C.

The examples in Table 1 below illustrate the high notched Izod impact strength of the copolyesters according to this invention.

TABLE 1

Effect of trans-4,4'-Stilbenedicarboxylic Acid on the Notched Izod Impact Strength of Poly(70/30 trans/cis 1,4-cyclohexylenedimethylene terephthalate)

| SDA Content, mol % | I.V. Initial | I.V. After Molding | Notched Izod Impact Strength, Ft-Lb/In. 23° C. | Notched Izod Impact Strength, Ft-Lb/In. −40° C. | Example No. |
|---|---|---|---|---|---|
| 0 | 0.76 | 0.67 | 17 | 1.3 | 5 |
|   | 1.00 | 0.80 | 15 | 3.0 | 6 |
| 5 | 0.98 | 0.92 | 22 | 3.0 | — |
| 10 | 1.04 | 0.96 | 24 | 15 | 2 |
| 20 | 0.80 | 0.70 | 17 | 5.2 | — |
|   | 0.93 | 0.85 | 22 | 20 | — |
| 30 | 0.91 | 0.86 | 18 | 14 | 3 |
| 30[a] | 0.75 | 0.69 | 14 | — | 4 |
| 40 | 0.83 | 0.69 | 16 | 14 | 1 |
| 50[a] | 0.75 | 0.74 | 12 | — | — |
| 50 | 0.87 | 0.79 | 14 | 15 | — |
| 60 | 0.81 | 0.66 | 2.3 | 2.3 | — |

[a]Prepared using 100 mol % trans-1,4-cyclohexanedimethanol.

The examples in the table above indicate the importance of the SDA content being between about 5 and to about 60 mol % by the effect on notched Izod impact strength, particularly when determined at −40° C.

The invention has been described in detail with particular reference to preferred embodiments thereof, bit it will be understood that variations and modifications can be effected within the spirit and scope of the invention.

I claim:

1. A polyester comprising repeating units from about 40 to about 95 mol % terephthalic acid, repeating units from about 5 to about 60 mol % trans-4,4'-stilbenedicarboxylic acid and repeating units from at least 60 mol % 1,4-cyclohexanedimethanol, said polyester having an inherent viscosity of 0.3 or more determined at 25° C. in 60/40 (wt/wt) phenol/tetrachloroethane at a concentration of 0.5 g/100 mL.

2. A polyester comprising repeating units from about 40 to about 95 mol % terephthalic acid, repeating units from about 5 to about 60 mol % trans-4,4'-stilbenedicarboxylic acid and repeating units from at least 60 mol % 1,4-cyclohexanedimethanol, said polyester having an inherent viscosity of 0.3 or more determined at 25° C. in 60/40 (wt/wt) phenol/tetrachloroethane at a concentration of 0.5 g/100 mL and said polyester, when injection molded, having a notched Izod impact strength at −40° C. of greater than 2.0 ft-lb/in. at −40° C.

3. A polyester according to claim 1 wherein the terephthalic acid is present in an amount of about 50–90 mol % and the trans-4,4'-stilbenedicarboxylic acid is present in an amount of about 10–50 mol %.

4. A polyester according to claim 1 wherein the acid component comprises up to 30 mol % of at least one other aromatic dicarboxylic acid having 8 to 20 carbon atoms.

5. A copolyester according to claim 1 wherein said 1,4-cyclohexanedimethanol contains at least 70% trans isomer.

6. A copolyester according to claim 1 wherein the I.V. is greater than 0.6.

* * * * *